United States Patent [19]

Wood et al.

[11] Patent Number: 5,572,016

[45] Date of Patent: Nov. 5, 1996

[54] PHOTOLUMINESCENCE BUILT-IN-TEST FOR OPTICALLY INITIATED SYSTEMS

[75] Inventors: Lance A. Wood, Winter Park, Colo.;
Paul J. Caldwell, Elkridge; Terrance L. Worchesky, Columbia, both of Md.

[73] Assignee: Martin Marietta Corporation, Bethesda, Md.

[21] Appl. No.: 428,377

[22] Filed: Apr. 25, 1995

[51] Int. Cl.⁶ .................... H01J 5/16; G02B 5/14
[52] U.S. Cl. .................. 250/227.15; 250/227.23; 250/226; 356/73.1
[58] Field of Search .................... 250/226, 227.18, 250/227.23, 227.14, 227.15, 302, 303, 458.1, 461.1, 492.1, 372; 356/73.1

[56] References Cited

U.S. PATENT DOCUMENTS

| | | | |
|---|---|---|---|
| 4,644,154 | 2/1987 | Brogardh et al. | 250/227.23 |
| 4,791,293 | 12/1988 | Barriere | 250/302 |
| 4,917,014 | 4/1990 | Loughry et al. | 102/201 |
| 5,270,537 | 12/1993 | Jacobs | 250/227.15 |
| 5,359,192 | 10/1994 | Williams et al. | 250/227.23 |

*Primary Examiner*—Stephone Allen
*Attorney, Agent, or Firm*—Gay Chin; Brian J. Rees; John J. Morrissey

[57] ABSTRACT

A built-in-test capability is provided for determining the integrity of an optical fiber connecting: (a) an optical firing unit having a primary light source emitting a first wavelength, a test light source emitting a second wavelength different from the first wavelength, a mechanism both for coupling light from the light sources to the optical fiber and also for coupling the return light to a filter/detector; and (b) an optically initiated device which is coupled to a second end of the optical fiber. The apparatus includes a photoluminescent material disposed at a junction of the optically initiated device and the optical-fiber-second-end. This photoluminescence material photoluminesces at a third wavelength (when exposed to the test light source), and the light travels through the optical fiber and, when detected indicates optical fiber continuity.

23 Claims, 7 Drawing Sheets

PHOTOLUMINESCENCE BUILT-IN-TEST FOR OPTICALLY INITIATED SYSTEMS

BACKGROUND INFORMATION

The present invention relates to fiber optic continuity test systems and, more particularly, to a single-ended tester capable of detecting discontinuities in an optical fiber.

Laser initiated ordnance (LIO) systems are well known in the art and typically employ a light pulse which is passed along a fiber optic cable and caused to impinge on an energetic material to heat it to ignition. Laser initiated systems are safer than electrical initiation systems in that the former are not susceptible to inadvertent initiation by static or stray electromagnetic radiation. In addition to avoiding accidental operation, however, ordnance systems are also required to reliably operate upon occurrence of a predetermined stimulus. Continuity of a firing channel must therefore be confirmed to determine whether the channel is misaligned, contaminated, mismated, severed, crushed or otherwise damaged. Without a test capability, the only available information relating to that damage is that, upon sending a "firing" light pulse, the ordnance does not initiate. Fiber optic continuity test systems are usually either single ended or dual ended, with singled ended systems being employed in LIO systems because access to only one end of the fiber is possible.

Many single-ended-testers utilize optical time domain reflectometry (OTDR). OTDR systems work by first transmitting pulses of light into a fiber and then measuring the light that is reflected back using sophisticated high speed detection and timing electronics. The time that it takes for the reflected light to return corresponds to the distance it travels along the fiber. This allows the OTDR system to produce a fiber signature. Two types of reflections occur. Pulse reflections are generated at breaks or joints where the light pulse encounters something other than a continuous glass core. In a typical LIO system, pulse reflections would occur where two sections of fiber-optic cable are connected, and at the interface between the end of the fiber-optic cable and the ordnance. Back scatter reflections are generated uniformly along a fiber as the transmitted pulse travels through the fiber. The back scatter signal provides a measurement of fiber attenuation. OTDR systems are frequently used for finding breaks in communication cables which are typically several kilometers long. One-half meter is considered excellent resolution for an OTDR system. In LIO systems, however, one meter resolution is not acceptable because a break close to the fiber/ordnance interface could not be distinguished from the end of the optical fiber by an OTDR system (e.g., a break only a millimeter from the fiber/ordnance interface would disable the laser ordnance system but would not be detected by an OTDR system). This difficulty is magnified by the from that the fiber/ordnance interface is a high stress region and is an area where cracks are likely to form.

Where the resolution of OTDR systems is unacceptable, fiber optic continuity systems employing a dichroic mirror have been utilized. U.S. Pat. No. 5,270,537 teaches a continuity test system employing a dichroic filter (at the fiber/ordnance junction) which reflects light within one wavelength range for continuity test proposes and transmits light within a second wavelength range for ignition purposes. There is a fiber optic conduit having a plurality of connectors contained therein, where the fiber-conduit connects the light sources with the ordnance device. The system tests the integrity of the optical fiber by shining a test laser into the fiber-optic cable, a portion of the light reflects as it passes each of the plurality of connectors. Each of these reflections travels to a detector through the fiber-optic cable and is detected. The majority of the test laser light which remains unreflected continues down the fiber-optic cable is reflected by the dichroic coating. The reflection of the test laser is also sent back up the fiber-optic cable and is detected. The system must be calibrated to distinguish between the reflections which occur at each connector, and the dichroic reflection, i.e., the system must determine the amount of light that must be reflected by the dichroic mirror to ensure there are no breaks in the fiber optic cable. In theory, if there is a break in the fiber-optic cable, the amount of light which transmits through the break, and is subsequently reflected by the dichroic mirror will be at a low level. The detector will detect this low level and determine that there is a break in the fiber-optic cable.

U.S. Pat. No. 5,359, 192, entitled "Dual-wavelength Low-power Built-in-test For a Laser-initiated Ordnance System" teaches another continuity test system employing a dichroic filter having a wavelength-dependent reflectivity. A fiber-optic-conduit having a plurality of connectors (three or more) connects the light sources with the ordnance device, and the dichroic filter is placed at the interface of an ordnance device and the optical fiber. The system tests the integrity of the optical fiber by shining two different wavelengths of test-light into the fiber and detecting the light reflected by the dichroic mirror. A relative comparison is made of the light reflected by the wavelength-dependent dichroic mirror of the two different wavelengths of light, and optical continuity is confirmed if more light will be reflected by the mirror at one of the wavelengths than the other. This scheme was developed to overcome the prior art deficiencies of trying to differentiate the reflections between the conduit-connectors and the dichroic mirror reflections because the connector-reflections will have a substantially flat optical response within a band encompassing the two wavelengths and therefore do not contribute to the differences in the intensities of the reflected light.

Thus, it is desirable to provide a simple and reliable single-ended apparatus for ascertaining fiber optic link continuity.

OBJECTS OF THE INVENTION

A primary object of the present invention is to provide a novel built-in-test-apparatus for determining whether there are breaks in a fiber-optic link in an optically initiated device.

Another object of the present invention is to provide a novel built-in-test-apparatus for determining the type of ordnance device to which the fiber optic link is connected.

SUMMARY OF THE INVENTION

In accordance with the present invention, an apparatus is provided for testing the integrity of an optical fiber connecting: (a) an optical firing unit having a primary light source emitting a first wavelength, a test light source emitting a second wavelength different from the first wavelength, a mechanism for both coupling light from the light sources to the optical fiber and also for coupling the return light to a filter/detector; and (b) an optically initiated device which is coupled to a second end of the optical fiber. The apparatus includes a photoluminescent material disposed at a junction of the optical-fiber-second-end and the optically initiated device. This photoluminescence material photoluminesces at a third wavelength (when exposed to the test light source) where the third wavelength is different from the first and second wavelengths, and where the photoluminescent light travels back through the optical fiber and, when detected, indicates optical fiber continuity.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings in which:

DETAILED DESCRIPTION

Figure 1:
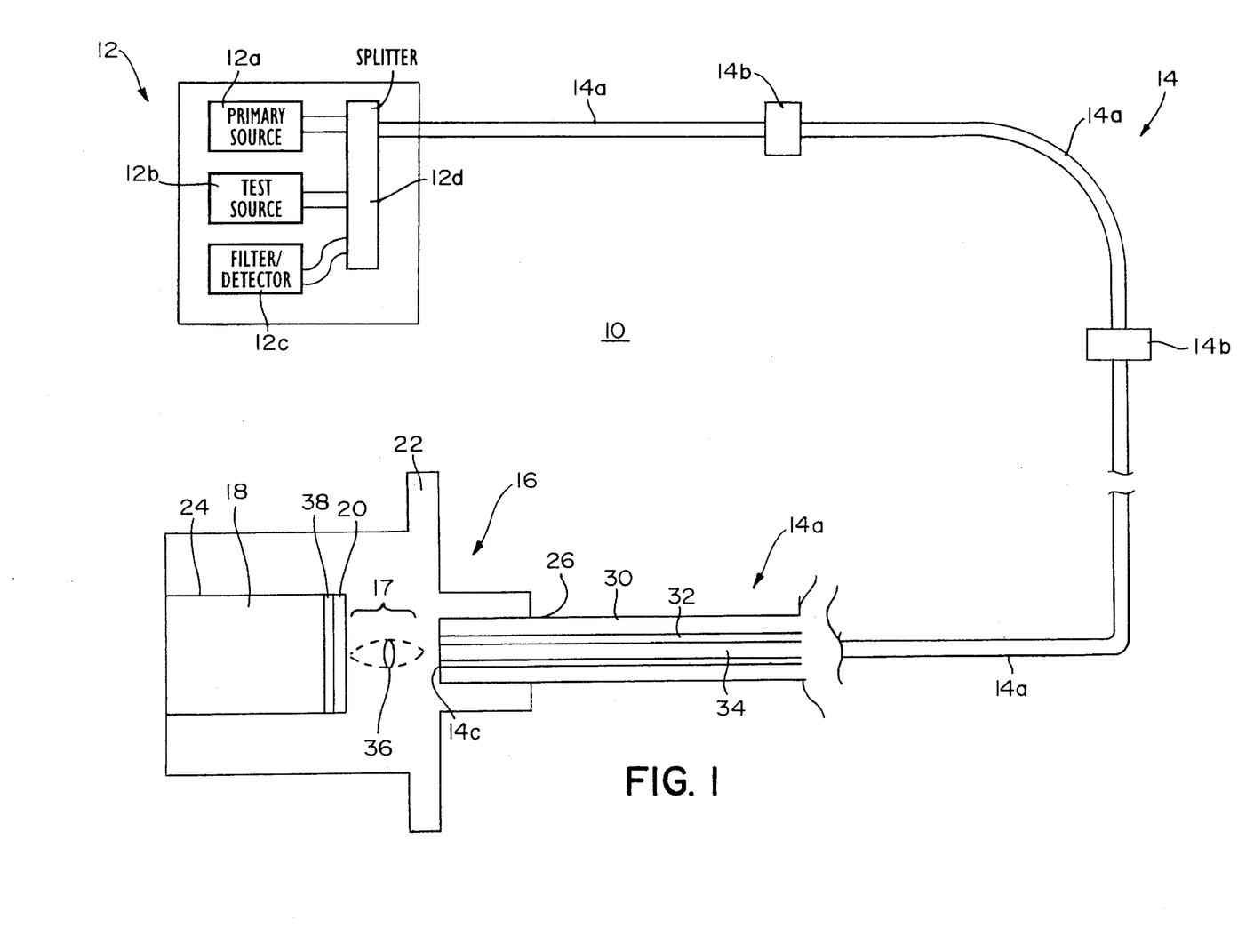
FIG. 1 is a simplified block drawing of a photoluminescence built-in-test structure, in accordance with the present invention.

FIG. 1 shows a photoluminescence built-in-continuity-test (PBIT) structure 10 adapted for use in an optically initiated ordnance system, where the test structure 10 includes an optical firing unit 12, a fiber-optic cable assembly 14, and an optically initiated device 16. Optical firing unit 12 has a primary (firing) optical source 12a which emits a light at a first wavelength of light. Primary optical source 12a is preferably a laser which may have an output wavelength and energy covering a broad range, with the only limitation being that the output energy have sufficient energy to initiate the energetic material 18 within optically initiated device 16. Preferably, laser 12a emits a light at a wavelength of about 850 nanometers (nm) and has a power of about 0.1 watts to several watts. Also housed in optical firing unit 12 is a secondary (testing) optical source 12b which emits a light at a second wavelength of light, and a filter/detector 12c. Test optical source 12b is preferably a laser which may have an output energy and wavelength covering a broad range, with the only limitation being that the output energy does not have sufficient energy to initiate the energetic material 18 within laser initiated device 16. For example, commercial diode lasers with low (milli-watt) power ratings are available in wavelengths of 640 nm, 670 nm or 720 nm.

Primary laser 12a, secondary laser 12b, and filter/detector 12c are coupled with fiber-optic cable assembly 14 through well known interconnection mechanisms 12d, such as a wavelength division multiplexor or a star splitter/coupler. Another method to interconnect lasers 12a and 12b, and detector 12d to fiber-optic assembly 14 is the use of a standard beam spitter and mirror structure, as taught in above referenced U.S. Pat. No. 5,270,537; this patent is hereby incorporated herein in its entirety by reference. Further, depending on the intended application of the PBIT structure 10, devices 12a, 12b and 12c may be discrete devices as described above, or these devices may be monolithically integrated on a single chip and coupled to fiber assembly 14 by a standard tapered fiber technique. Fiber-optic assembly 14 has fiber-optic cables 14a of well known type and design, and connectors 14b, also of well known type and design which connect discrete lengths of fiber optic cables 14a.

In accordance with the present invention, a photoluminescence material layer 20 is disposed at a junction 17, between an end 14c of cable 14a and ordnance, or energetic material 18 within optically initiated device 16. Photoluminescence material 20 may be disposed anywhere within junction 17, e.g., on fiber-end face 14c, on either face of, or within, a lens 36 (described in detail hereinbelow), or on a face of, or within, energetic material 18. By optically initiated device 16 we mean any optically activated device (or system) which responds to optical stimulus, e.g., energy. Examples of optically activated devices 16 are: optical sensors; optical communication system receivers; optically initiated ordnance systems; fiber amplifier systems; and the like. The presently preferred optically initiated device 16 is an ordnance system, which may be any one of a variety of devices, such as detonators, initiators, pyrotechnics, and the like.

Ordnance device 16 includes a housing 22 having a charge cavity 24 containing energetic material 18, and a optical-fiber-sealing-means 26 adapted to secure fiber 14a entering housing 22. Fiber-optic cable 14a includes a protective sheath 30, a cladding material 32, and a core material 34. To test the integrity of the optical fiber assembly 14, test laser 12b emits a beam of light into the optical fiber assembly 14. The light travels through the optical fiber core 34, with some of the light being reflected by the connectors 14b in the optical fiber assembly, but the vast majority of test laser light continues through fiber core 34 and enters optical initiation device 16. The light enters housing 22 and impinges on photoluminescence material 20. Material 20 may be a broad class of materials which absorb at the test laser wavelength, e.g., 670 nm, and photoluminescence upon exposure to (or soon thereafter) the light of test laser 12b, where the photoluminescence is at different wavelength than that emitted by either primary laser 12a or test laser 12b. Depending on the intended application of PBIT system 10, it may be preferred that material 20 be substantially transparent at the primary laser wavelength, e.g., 850 nm. Additionally, the light created by material 20 upon exposure to the light emitted by test laser 12b should also not be of sufficient energy to heat the energetic material 18 to its auto-ignition temperature.

Optionally, lens 36, of well known type, may be placed in junction 17 (between fiber 14a and photoluminescence material 20) to focus the light exiting fiber end 14c (i.e., decrease the spot size and to increase the power density of the light). This focused light augments both the initiation of energetic material 18 and the photoluminescence of material 20. Further, a dichroic material layer 38 may optionally be placed between photoluminescence material 20 and ordnance material 18. Dichroic material 38 would be substantially transparent to the wavelength of light produced by primary laser 12a and substantially reflective both to the wavelength of light produced by test laser 12b and the light produced by the photoluminescence of material 20. Dichroic material 38 would help concentrate the amount of test laser light to which material 20 is exposed and therefore increase the amount of light photoluminesced therefrom. Also, when material 20 photoluminesces, dichroic material 38 would help increase the amount of light coupled back into fiberoptic cable 14a through end 14c, and therefore amount which travels back to detector 12c.

Materials which may be used as photoluminescence material 20 include any one of a number of dye materials which are contained within a polymer carrier. For example, Eastman Kodak Company, located in Rochester, New York publishes a catalog of optical products, and within that catalog specific absorption and photoluminescence spectra are shown for a plurality of laser dyes. Although not wanting to be limited by any specific list of laser dyes, some examples of useful dye materials include: nile blue A perchlorate (NB); 3'3;'diethylthiatricarbocyanine perchlorate (DTTC perchlorate); 3—3'diethylthiadicarbocyanine iodide (DTDC iodide);and 3—3'diethylthiatricarbocyanine iodide (DTTC iodide). Each of these must be incorporated into a polymer matrix, with the only limitation on the polymer matrix being that, when cured, the polymer should not have substantial absorbtion in the wavelengths emitted by primary laser 12a, test laser 12b or the photoluminescence of material 20. When a dye is incorporated into a polymer, the wavelength at which it absorbs tends to shift slightly. Although this does not detract from the operability of the present invention, it must nevertheless be taken into account when assembling PBIT system 10. Examples of suitable polymer carriers include: polyvinyl butyral (PVB); epoxies such as "EP30-1", made by Master Bond Epoxy in Hackensack, NJ and "Epo-Tek 310" made by Epoxy Technology, Inc., in Billerica MA; Norland Optical Adhesive 61, made by Norland Products, Inc., Newbrunswick, NJ; and Lens Bond Optical Cement Type SK-9, made by Summers Optical, in Fort Washington, PA. The laser dyes are added to the polymer until a saturated solution is obtained. The polymer is then spread into a thin film and cured.

Figure 2:
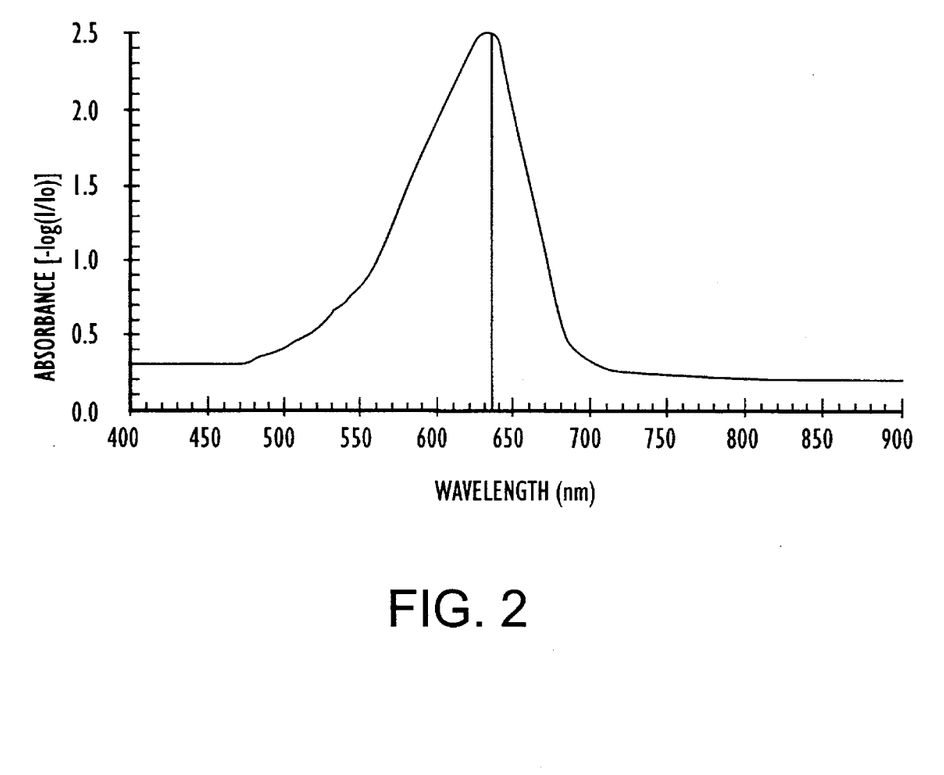
FIG. 2 is a graph showing the absorbtion characteristics of nile blue A perchlorate in polyvinyl butyral.
Figure 3:
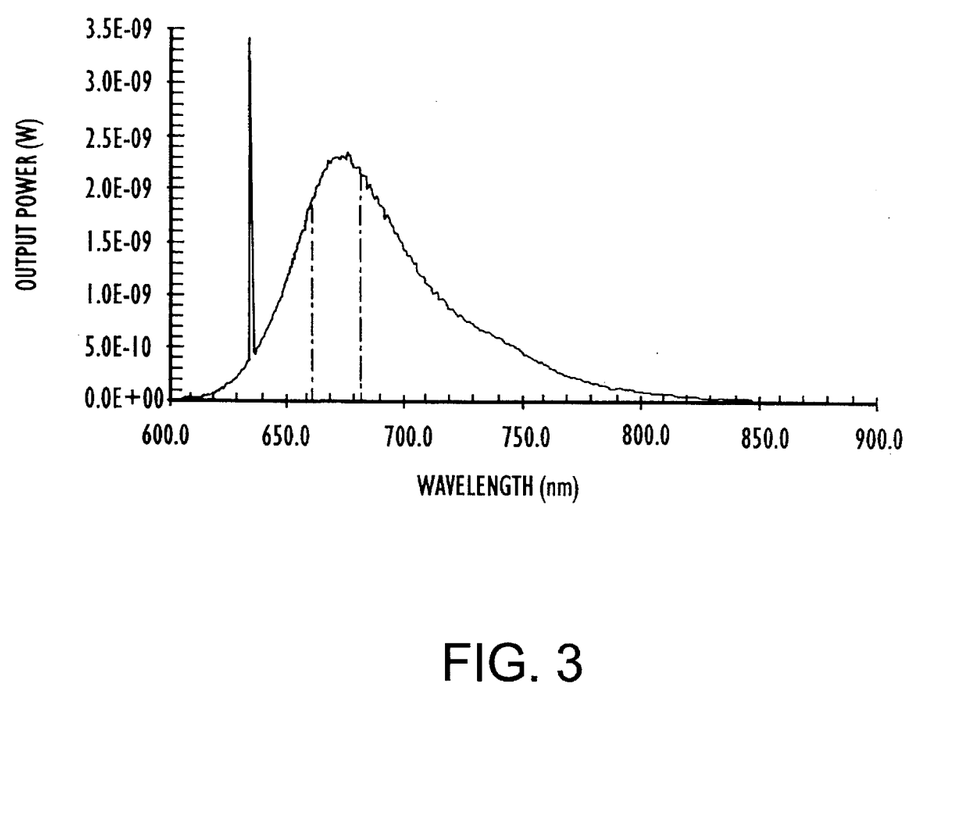
FIG. 3 is a graph showing the photoluminescence intensity of nile blue A perchlorate in polyvinyl butyral.

One preferred photoluminescence material 20 comprises a NB laser dye contained within a PVB polymer carrier at a concentration of $7\times10^{15}$ molecules per squared centimeter. Incorporation of NB in PVB does not substantially shift the absorbance of NB. FIG. 2 shows the absorbance characteristics of an NB/PVB film over a range of wavelengths. As shown, the absorbance is maximized at approximately 640 nm (the test laser wavelength) and a minimum absorbance at approximately 850 nm (the primary laser wavelength). FIG. 3 shows the output power the photoluminescence light produced by this same NB/PVB film. As shown, the photoluminescence peak is maximized at approximately 672 nm which is different than the wavelength emitted by either primary laser 12a or test laser 12b, and is of sufficient power to travel through fiber optic cable assembly to filter/detector 12c. It should be understood that there are a wide range of capable laser dye materials for the application of the present invention and that all such materials are within the scope of the present invention.

Polymer carriers for laser dye materials have limited usefulness in space applications due to outgassing of the solvents within the polymer solution prior to curing, and other well known problems with polymer operation at very low pressures and temperatures. Therefore, for space or other applications, a presently preferred photoluminescence material 20 utilizes semiconductor structures. For example, direct band gap semiconductors have photoluminescent properties, and the photoluminescence peak will shift depending on the width of the band gap. Although the photoluminescence peak can shift over a broad range, to achieve a photoluminescence peak of approximately 747 rim, the band gap of the semiconductor should be approximately 1.6 eV. The presently-most-preferred semiconductor structure is a quantum well structure. With a quantum well structure the photoluminescence peak can be tailored with a high degree of precision and the intensity of the photoluminescence light is typically higher than that obtainable with laser dyes. A detailed discussion of quantum well technology can be found in C. Weisbuch, "Quantum Semiconductor Structures" published by Academic Press, Inc. 1990. This book is hereby incorporated herein in its entirety by reference. Quantum well photoluminescent materials can be made using many different kinds of semiconductors which will be known to those skilled in the art. The choice of materials and layer structure is determined by the wavelength region to be absorbed and the wavelength of photoluminescence to be emitted. It should be understood that all such semiconductor systems and all such structures are within the scope of the present invention.

Figure 4:
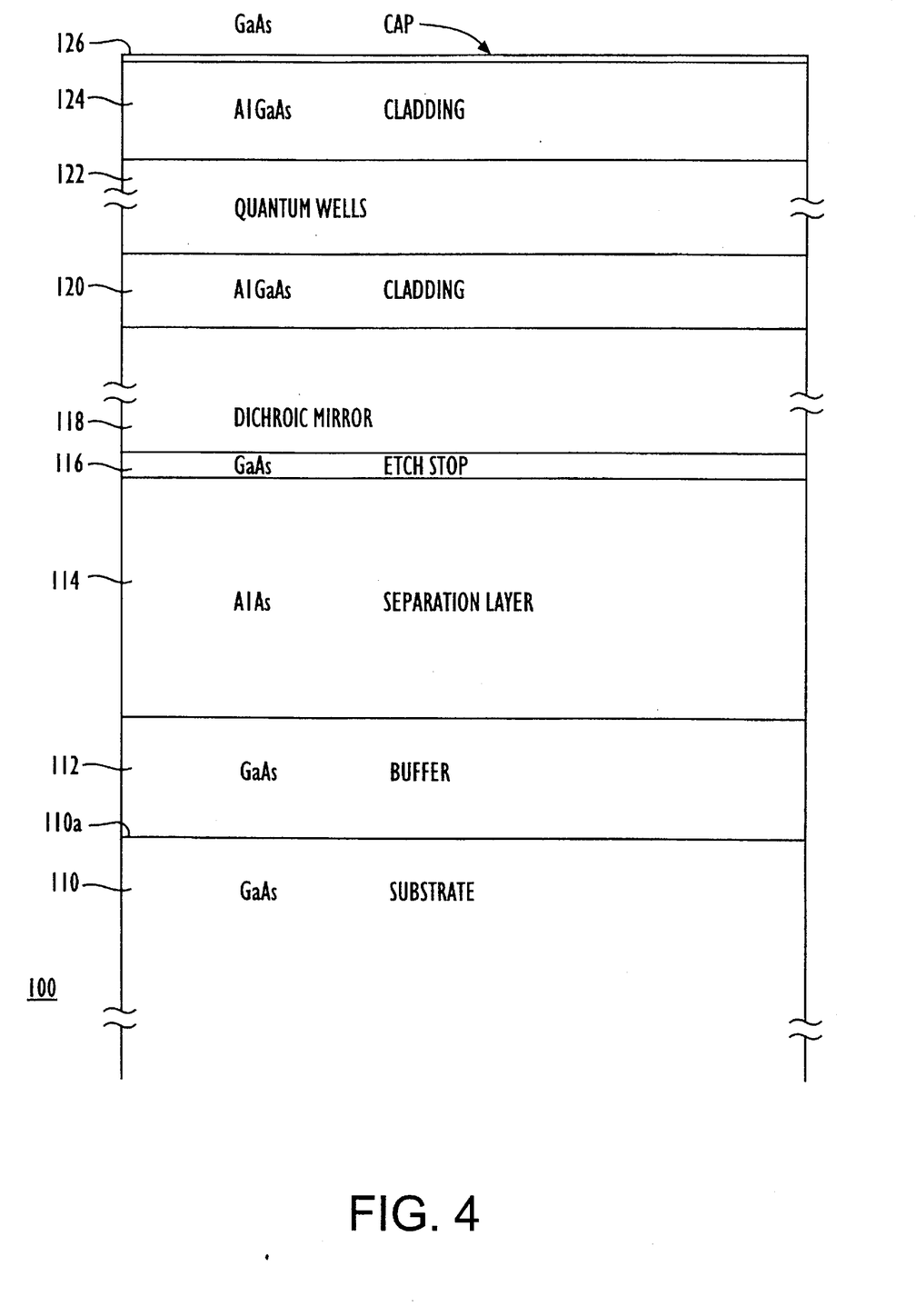
FIG. 4 is a cross-sectional view of a sample quantum well photoluminescence structure of the present invention.

FIG. 4 shows a sample structure of a quantum-well-photoluminescence material (QWPM) 100 according to the present invention. QWPM 100 is prepared, or grown, in the following manner. Growth starts with a commercially produced substrate 110 having a mechanically and chemically polished surface 110a. Then, a 0.5 micron thick buffer layer of gallium arsenide (GaAs) 112 is grown to cover any damage to the crystal lattice structure caused by the polishing process. Next, a 1 micron thick aluminum-gallium-arsenide (AlGaAs) separation layer 114 (with an aluminum content on the order of 95–100 percent) is disposed thereon. Separation layer 114 is used to facilitate layer removal of the substrate 110 and buffer layer 112 from the structure 100. The next layer grown is a 0.12 micron thick GaAs etch stop layer 116 which is insensitive to the chemical etchants used to remove separation layer 114. If desired, optional dichroic material 38, described in detail hereinabove, can be integrated into QWPM 100 as layer 118. Dichroic layer 118 includes a plurality of alternating and juxtaposed layers of GaAs and AlGaAs, built up to a desired thickness. Each layer of GaAs and AlGaAs is approximately 52 nm and although the thickness may vary, depending on the wavelength of light to be reflected and the amount of reflectivity needed, a typical thickness of layer 118 is approximately 1 micron. Two 0.25 micron layers of AlGaAs cladding (120 and 124) are disposed on either side of quantum well structure 122, and are chosen to be optically transparent to the light emitted by primary laser 12a, test laser 12b, or the quantum well region (i.e., the photoluminescent peak). The purpose of cladding layers 120 and 124 are to block the escape of carriers (electrons and holes) generated by absorption in quantum well region 122, and such confinement helps maximize the emitted photoluminescence intensity.

Quantum well structure 122 consist of a series of alternating and juxtaposed layers of AlGaAs barrier layers and GaAs wells. The thickness of each barrier layer is approximately 5 nm and the thickness of each well is approximately 10 nm. The carriers generated by optical absorption fall into the wells and then recombine (from well-defined quantized energy levels) to emit photoluminescent light. By choosing the thickness and composition of the barriers and wells, both the optical absorption wavelength region and optical emission (photoluminescence) can be tailored. On top of QWPM 100 is a thin GaAs cap 126 to protect the top AlGaAs cladding layer 124 from moisture.

Figure 5:
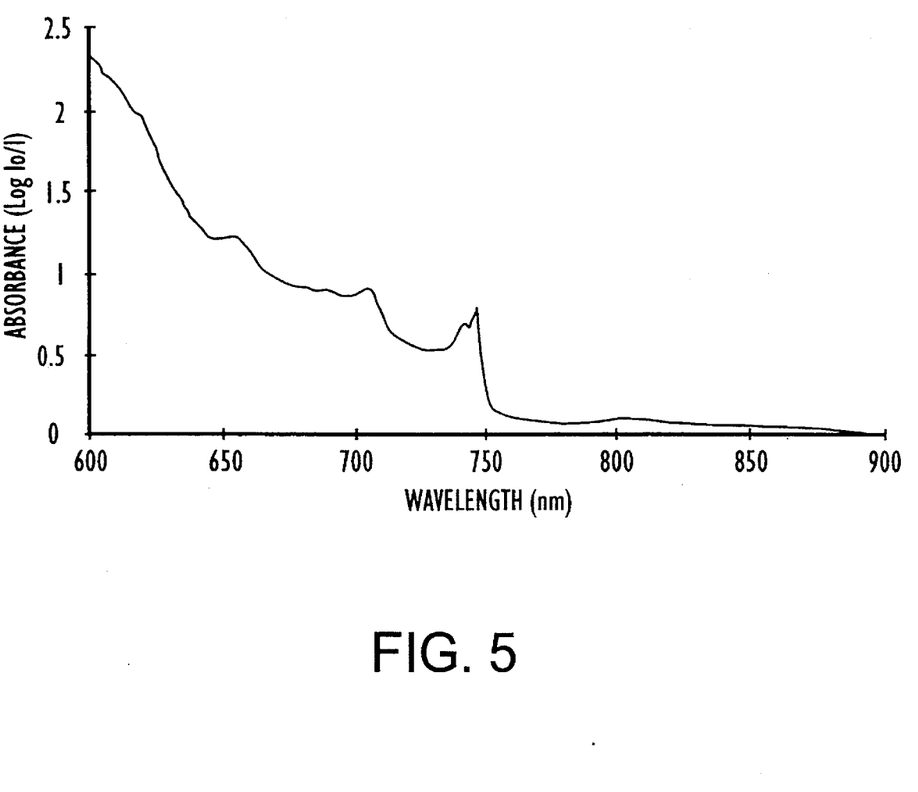
FIG. 5 is a graph showing the absorbtion characteristics of a quantum well structure.
Figure 6:
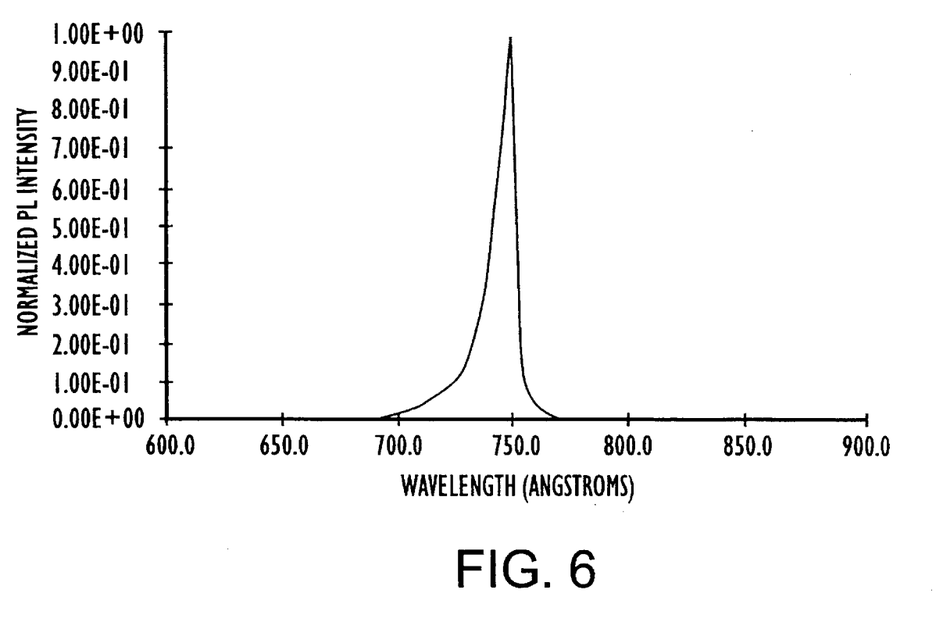
FIG. 6 is a graph showing the photoluminescence intensity of a quantum well structure.

FIG. 5 shows the absorbance characteristics of a quantum well structure (100 in FIG. 4) for various wavelengths of light. As shown, the material transmits light at the wavelength produced by primary laser 12a, e.g., 850 nm, and absorbs at the wavelength produced by test laser 12b, e.g., 640 nm. Further, FIG. 6 shows the output photoluminescence power produced by the same quantum well structure which has a maximum power output at approximately 747 nm which is different than the wavelength emitted by either primary laser 12a or test laser 12b, and is sufficient to travel through fiber optic cable assembly to detector 12c. It should be understood that those skilled in the art can vary the quantum well structure to tailor the absorbance and transmittance for a particular application, and that all such structures are within the scope of the present invention.

Referring again to FIG. 1, photoluminescence material 20 photoluminesces when exposed to test laser 12b. As the photoluminesced light travels back through fiber optic assembly 14, it is coupled to filter/detector 12c which is configured to measure only that wavelength of light. As stated above, the photoluminescent light has a different wavelength than the light emitted by either primary laser 12a or test laser 12b. Thus, if detector 12c is configured to only measure the known wavelength of light produced by the photoluminescence of material 20, detector 12c will not measure any of the above described reflections (of laser light emitted by lasers 12a and 12b) by interconnections 14b in fiber-optic assembly 14. This is accomplished by positioning a filter assembly, of well known type, within detector 12c such that only the photoluminescence wavelength passes through to be detected. This capability simplifies the overall PBIT system 10 in that no high speed electronics are needed to calculate the time of these reflections, nor does detector 12c need to distinguish between reflections of the same wavelength but having slightly different intensities. Detector 12c need only look for the wavelength produced by photoluminescence material 20, and if detected, continuity of fiber-optic cable assembly 14 is confirmed. If a break is present within assembly 14, a substantial portion of the light from test laser 12b will be reflected and the small amount of light impinging on photoluminescence material will cause a photoluminescent peak of very low intensity. This peak intensity will travel back through the fiber optic assembly, will be reflected by the break, and the amount reaching the detector will be of sufficiently low intensity, i.e., below some threshold, so as to indicate a break.

Although it is presently preferred that primary laser 12a and test laser 12b have distinct wavelength ranges, such that photoluminescent material 20 absorbs test wavelength and does not absorb primary wavelength, it should be understood that primary laser 12a and test laser 12b may emit the same wavelength of light. In such an embodiment, primary laser 12a and test laser 12b can be combined into one laser 12a' with two power settings (high and low). The wavelength of light emitted by laser 12a' corresponds to the absorbtion peak of photoluminescent material 20. Thus, at low power settings, the light emitted by laser 12a' is absorbed by material 20, which will photoluminesce and the photoluminescent light will travel back through the fiber optic assembly and will be detected. As long as this low power setting does not have sufficient energy to combust energetic material 18, there is no danger of ignition during a test pulse. Since the high power setting will also be absorbed by photoluminescence material 20, there must be sufficient power to pass enough energy through material 20 to combust energetic material 18. This can be accomplished either by having the energy not absorbed by photoluminescent material of sufficient power to initiate combustion of material 18, or by having enough power to essentially vaporize photoluminescent material and then pass energy though to combust material 18.

While the photoluminescence material 20 is described in detail herein as it relates to an optically initiated device, it should be understood that the photoluminescence-built-in-test structure of the present invention can be used with other optical systems where a known return signal is desired from a certain location. As stated above, the optically initiated devices of the present invention can be any optically activated device which responds to optical stimulus.

In accordance with yet another aspect of the present invention, a variety of different photoluminescent materials 20 each of which photoluminesce at a distinct and particularly different wavelength can be designated to, and paired with, a distinct type of ordnance device. As stated above, a typical optically initiated ordnance system may have a multitude of distinct ordnance devices for various uses. For example, one ordnance device may be used for rocket ignition, another for staging, and another for flight termination. Each of these ordnances may be paired with a different particular photoluminescence material (i.e., having a different particular photoluminescent peak) to distinguish each ordnance device during fiber-continuity tests. Such a system could be used to ensure that each and every use (e.g., staging and ignition) is connected to the proper ordnance.

Figure 7:
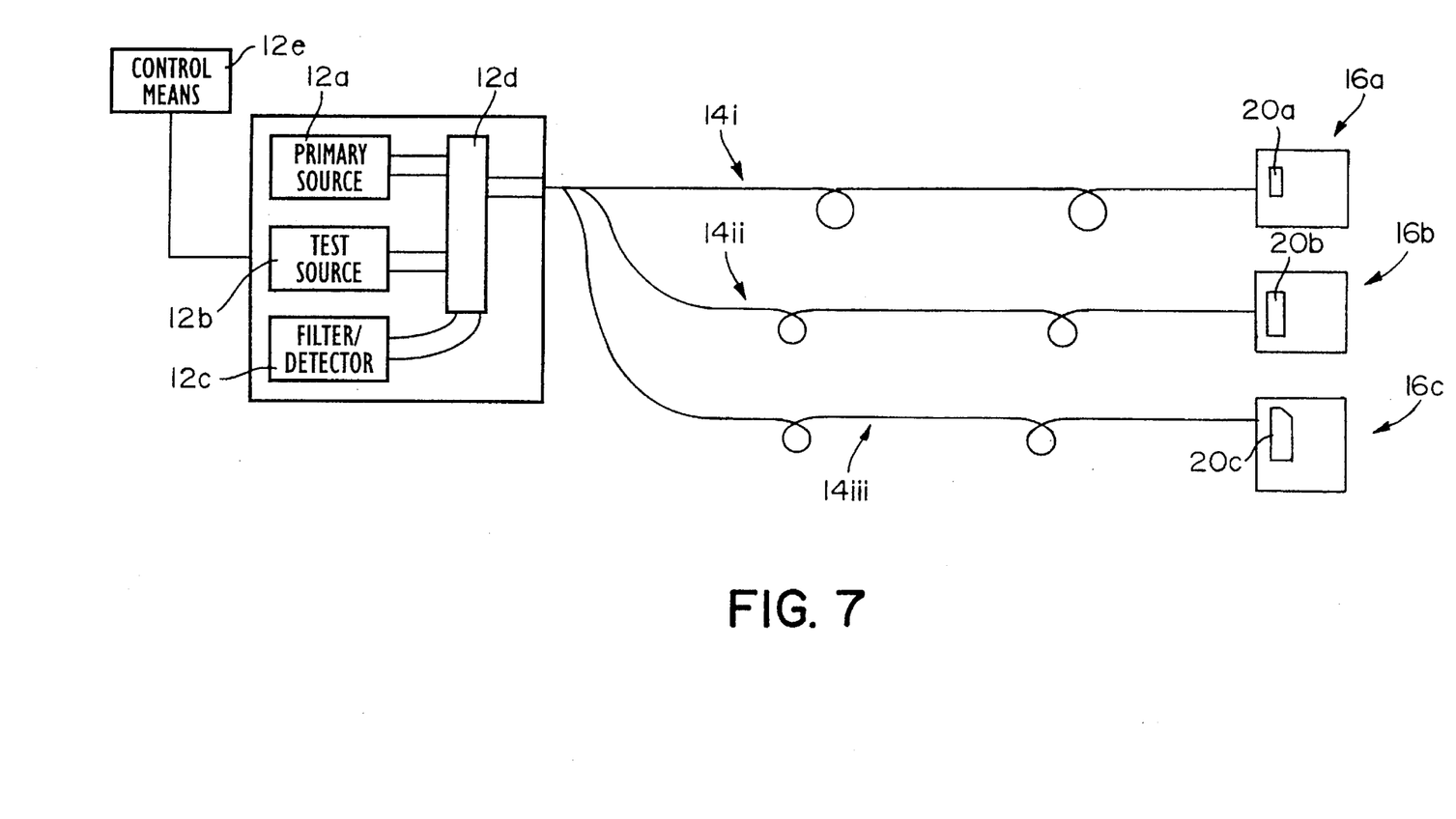
FIG. 7 is a simplified block drawing of a plurality of photoluminescence built-in-test structures.

Referring now to FIG. 7, using like designations for like elements, an optical firing unit 12 has a primary optical source (laser) 12a, a test optical source (laser) 12b, coupling means 12d and a filter/detector 12c capable of filtering out and measuring a variety of wavelengths of light. Optical firing unit 12 is connected to a plurality of optically initiated devices, e.g., 16a, 16b and 16c, by a respective fiber optic cable assembly (14i, 14ii and 14iii), and each of the plurality of optically initiated devices has a respective photoluminescence material (20a, 20b and 20c) each of which photoluminesces at a different distinct wavelength. In operation, common test laser 12b would fire, directing a specific first wavelength of light down all fiber optic cables (14i, 14ii and 14iii) to all of optically initiated devices ( 16a, 16b and 16c), but filter/detector 12c would be set, by controlling electronics 12e, of well known type, to measure only the known wavelength of, for example, first photoluminescence material 20a. Since absorbtion in photoluminescent material is broad band, and the photoluminescent light is narrow band, a single test laser 12b, can be used which has a wavelength within the broadband absorption of all of photoluminescence materials (20a, 20b and 20c), and each photoluminescent light wavelength, being of narrow band, will be separate and distinct (for optically initiated device identification). Once detector 12c confirms the continuity of fiber-optic cable 14i, test laser 12b would fire again, but controlling means 12e would reset detector 12c to measure only the different (second) wavelength emitted from, for example, second photoluminescence material 20b. If the photoluminescent peak of material 20b were not detected, electronics 12e could drive detector 12c to scan the wavelength ranges for photoluminescent materials 20a and 20c to determine if the wrong optically initiated device was installed. This process would be repeated until the continuity of all fiber optic cable assemblies were confirmed and, additionally, it is confirmed that the proper optically initiated device is placed in the correct location of the overall system.

While the invention is described herein in some detail, many modifications and variations will become apparent to those skilled in the art; it is our intent to be limited only by the scope of the appending claims, and not by the specific details or instrumentalities present herein by way of description of the preferred embodiments.

What is claimed is:

1. An apparatus for testing the integrity of an optical fiber from a single end of said fiber, comprising:

optical means for selectively transmitting light energy within first and second wavelength ranges into a first end of said optical fiber;

an optically initiated device coupled to a second end of said optical fiber;

means for filtering and detecting coupled to said first end of said optical fiber; and a photoluminescence material, disposed at a junction of said device and said second end of optical fiber, being substantially transparent to said first wavelength range and photoluminescent when exposed to said second wavelength range at a different wavelength from either said first or said second wavelength range, said photoluminescent light being coupled into said second end of said optical fiber for passage through said optical fiber to said filtering and detecting means, which will respond to said photoluminescent light for indicating continuity of said optical fiber.

2. The apparatus of claim 1, further including a means for coupling light from said optical means into said optical-fiber-first-end, a means for pulsing said optical means and means for alternately interrupting light from either said first wavelength range or second wavelength range entering said optical fiber.

3. The apparatus of claim 2, where said photoluminescent material comprises a laser dye incorporated into a polymer carrier.

4. The apparatus of claim 3, where said laser dye is a material selected from the group consisting essentially of: nile blue A perchlorate (NB); 3—3'-diethylthiatricarbocyanine perchlorate; 3—3'-diethylthiadicarbocyanine iodide; and 3—3'-diethylthiatricarbocyanine iodide.

5. The apparatus of claim 3, where said polymer carrier is a polymer which is optically transparent in: said first wavelength range, said second wavelength range and photoluminescent wavelength range.

6. The apparatus of claim 2, further comprising a means for focusing light exiting said optical-fiber-second-end.

7. The apparatus of claim 2, further comprising a dichroic mirror disposed on a surface of said photoluminescent material remote from said second end of said optical fiber, where said dichroic mirror is transparent to said first wavelength range and is reflective to both said second wavelength range and said photoluminescent light.

8. The apparatus according to claim 1, where said photoluminescent material comprises a semiconductor means for transmitting said first wavelength range and photoluminesces where exposed to said second wavelength range.

9. The apparatus according to claim 8, where said semiconductor means includes a quantum well structure.

10. The apparatus of claim 9, further comprising a means for focusing light exiting said optical-fiber-second-end.

11. The apparatus of claim 9, where said quantum well structure incorporates a dichroic mirror means for transmitting said first wavelength range and reflecting said second wavelength range and said photoluminescent light.

12. The apparatus of claim 1, where said first and second wavelength ranges transmitted by said optical means are substantially identical and have a high power setting and a low power setting.

13. An apparatus for testing the integrity of an optical fiber in an optically initiated ordnance system from a single end of said fiber, comprising:

optical means for selectively transmitting light energy within a first wavelength range and a second wavelength range;

means for coupling light from said optical means into a first end of said optical fiber;

means for filtering and detecting coupled to said first end of said optical fiber;

an optically initiated device coupled to a second end of said optical fiber and having an energetic material which, when exposed to said first wavelength range, is heated to a combustible temperature;

a photoluminescent material, disposed at a junction of said energetic material and said second end of optical fiber, being substantially transparent to said first wavelength range and photoluminescent when exposed to said second wavelength range at a different wavelength from either said first or said second wavelength range, said photoluminescent light being coupled into said second end of said optical fiber for passage through said optical fiber to said filtering and detecting means, which will respond to said photoluminescent light for indicating continuity of said optical fiber.

14. The apparatus of claim 13, further comprising: means for pulsing said optical means; means for alternately interrupting light from either said first wavelength range or second wavelength range entering said optical fiber; and means for focusing light exiting said optical-fiber-second-end.

15. The apparatus of claim 13, further comprising a dichroic mirror disposed on a surface of said photoluminescent material remote from said second end of said optical fiber, where said dichroic mirror is transparent to said first wavelength range and is reflective to both said second wavelength range and said photoluminescent light.

16. The apparatus of claim 13, where said photoluminescent material is a laser dye incorporated into a polymer carder which is optically transparent in: said first wavelength range, said second wavelength range and said photoluminescent wavelength range.

17. The apparatus of claim 13, where said photoluminescent material comprises a quantum well means for transmitting said first wavelength range and photoluminesces when exposed to said second wavelength range.

18. An apparatus for testing the integrity of a plurality of optical fibers in an optically initiated ordnance system from a single end of each of said plurality of fibers, comprising:

optical means for selectively transmitting light energy within first and second wavelength ranges;

means for coupling light from said optical means into a first end of said plurality of optical fibers; and a plurality of optically initiated devices, each coupled to a respective second end of said plurality of optical fibers and each having:

an energetic material which, when exposed to said first wavelength range, is heated to a combustible temperature;

a photoluminescent material, disposed at a junction of said energetic material and said second end of said respective optical fiber, being substantially transparent to said first wavelength range and photoluminescent when exposed to said second wavelength range at a different wavelength from either said first wavelength range or said second wavelength range, said photoluminescent light being coupled into said second end of said respective optical fiber for passage through said respective optical fiber to a means for filtering and detecting coupled to said first end of said plurality of optical fibers; where each respective photoluminescent light of each respective one of said plurality of optically initiated devices is within a distinct wavelength range; and where said filtering and detecting means is responsive to all of said photoluminescent light wavelengths for indicating continuity of each of said plurality of optical fibers, and further for determining the optically initiated device connected to each of said plurality of fibers.

19. The apparatus of claim 18, further including a means for pulsing said optical means and means for alternately interrupting light from either said first wavelength range or second wavelength range entering said optical fiber.

20. The apparatus of claim 18, where each of said plurality of optically initiated devices further comprises a means for focusing light exiting all of said optical-fiber-second-ends.

21. The apparatus of claim 20, where each of said optically initiated devices further comprises a dichroic mirror disposed on a surface of said photoluminescent material remote from said second end of said optical fiber, where said dichroic mirror is transparent to said first wavelength range and is reflective to both said second wavelength range and all of said photoluminescent light wavelength ranges.

22. The apparatus of claim 21, where said photoluminescent material of each of said optically initiated devices comprises a laser dye incorporated into a polymer carrier means which is optically transparent in: said first wavelength range, said second wavelength range and said photoluminescent wavelength range.

23. The apparatus according to claim 21, where said photoluminescent material of each of said optically initiated devices comprises a quantum well means for transmitting said first wavelength range and photoluminesces when exposed to said second wavelength range.

* * * * *